(12) United States Patent
Ng (10) Patent No.: US 11,236,504 B2
(45) Date of Patent: Feb. 1, 2022

(54) MOUNTING STRUCTURE (71) Applicant: TH3X CONSTRUCTION CONSULTANCY PTE. LTD., Singapore (SG)

(72) Inventor: Shyang Long Eric Ng, Singapore (SG)

(73) Assignee: TH3X CONSTRUCTION CONSULTANCY PTE. LTD., Singapore (SG)

( * ) Notice: Subject to any disclaimer, the term of this patent is extended or adjusted under 35 U.S.C. 154(b) by 0 days.

(21) Appl. No.: 16/641,356

(22) PCT Filed: Aug. 23, 2018

(86) PCT No.: PCT/SG2018/050427
§ 371 (c)(1),
(2) Date: Feb. 24, 2020

(87) PCT Pub. No.: WO2019/040003
PCT Pub. Date: Feb. 28, 2019

(65) Prior Publication Data
US 2020/0224407 A1 Jul. 16, 2020

(30) Foreign Application Priority Data

Aug. 25, 2017 (SG) .......................... 10201706990X (51) Int. Cl.
*E04B 1/41* (2006.01)
*H02S 30/10* (2014.01)
(Continued)

(52) U.S. Cl.
CPC .............. *E04B 1/40* (2013.01); *E04B 1/2403* (2013.01); *H02S 30/10* (2014.12);
(Continued)

(58) Field of Classification Search
CPC . E04B 1/40; E04B 1/2403; E04B 2/88; E04B 2/885; E04B 2/96; F24S 25/20;
(Continued)

(56) References Cited

U.S. PATENT DOCUMENTS 4,114,595 A * 9/1978 Barker .................... F24S 25/37
126/648
8,776,454 B2 * 7/2014 Zuritis .................... F24S 25/35
52/173.3

(Continued)

FOREIGN PATENT DOCUMENTS

AU 2016100970 A4 8/2016
CN 103258882 A 8/2013
(Continued)

OTHER PUBLICATIONS

Machine translation of foreign reference DE 9415616, obtained from https://worldwide.espacenet.com/patent/search/family/006914205/publication/DE9415616U1?q=de9415616 (last accessed on Dec. 18, 2020) (Year: 2020).*
(Continued)

*Primary Examiner* — Theodore V Adamos
(74) *Attorney, Agent, or Firm* — JCIP; Joseph G. Chu; Jeremy I. Maynard (57) ABSTRACT

The present invention relates to a mounting structure comprising a structural member having a first surface adapted to engage a support and at least one first flange extending outwardly from a second surface, wherein the first surface is distal from the first flange; and at least one securing member comprising at least one second flange extending outwardly from a surface of the securing member, wherein the securing member is operable to juxtapose with the structural member via the first surface, and engage with the structural member to secure a side of a panel between the first flange and the
(Continued)

second flange. The present invention also relates to a mounting structure assembly and method of assembling the same.

17 Claims, 6 Drawing Sheets (51) Int. Cl.
    *E04B 1/24*      (2006.01)
    *H02S 20/23*      (2014.01)
    *H02S 20/26*      (2014.01)
    *E04D 1/12*      (2006.01)
    *E04D 1/34*      (2006.01)

(52) U.S. Cl.
    CPC ........ *E04B 2001/2406* (2013.01); *E04D 1/12* (2013.01); *E04D 1/34* (2013.01); *H02S 20/23* (2014.12); *H02S 20/26* (2014.12)

(58) Field of Classification Search
    CPC ...... F24S 25/37; F24S 25/35; F24S 2025/804; H02S 30/10; E04D 2003/285
    See application file for complete search history.

(56) References Cited

U.S. PATENT DOCUMENTS

| | | | | |
|---|---|---|---|---|
| 2006/0118163 | A1* | 6/2006 | Plaisted | F24S 25/35 136/251 |
| 2010/0276558 | A1* | 11/2010 | Faust | F24S 25/65 248/222.14 |
| 2010/0313506 | A1* | 12/2010 | Schoell | F24S 25/20 52/302.1 |
| 2011/0302857 | A1* | 12/2011 | McClellan | F24S 25/35 52/173.3 |
| 2012/0102854 | A1 | 5/2012 | Meier et al. | |
| 2013/0340358 | A1* | 12/2013 | Danning | H02S 20/23 52/126.7 |
| 2015/0129517 | A1* | 5/2015 | Wildes | F24S 25/61 211/41.1 |
| 2015/0184896 | A1* | 7/2015 | Lippert | F24S 25/636 211/41.1 |
| 2015/0340986 | A1* | 11/2015 | Shih | F24S 25/65 136/251 |
| 2016/0111997 | A1* | 4/2016 | Ganshaw | F16M 13/02 248/224.7 |
| 2016/0126884 | A1 | 5/2016 | Stearns et al. | |
| 2016/0130797 | A1* | 5/2016 | Bruce | E04B 1/40 52/698 |
| 2018/0094418 | A1* | 4/2018 | Winter | E04B 1/5831 |
| 2018/0262157 | A1* | 9/2018 | Hsueh | E04D 11/005 |
| 2018/0323744 | A1* | 11/2018 | Hudson | F24S 25/33 |
| 2020/0059195 | A1* | 2/2020 | Wang | F24S 25/636 |
| 2020/0099332 | A1* | 3/2020 | Rossi | H02S 30/10 |
| 2020/0266754 | A1* | 8/2020 | Ferris | H02S 30/10 |

FOREIGN PATENT DOCUMENTS

| | | | | |
|---|---|---|---|---|
| CN | 205490304 U | | 8/2016 | |
| CN | 206149186 U | | 5/2017 | |
| DE | 9415616 U1 | * | 1/1995 | ........... F24S 25/634 |
| DE | 202005015455 U1 | | 2/2007 | |
| FR | 2957405 A1 | * | 9/2011 | ........... H02S 20/23 |
| FR | 2960625 A1 | | 12/2011 | |
| JP | 2009130183 A | | 6/2009 | |
| JP | 2014185421 A | | 10/2014 | |

OTHER PUBLICATIONS

Written Opinion of International Search Authority, replaced Written Opinion, International Search Report, and Revised International Search Report for International Application No. PCT/SG2018/050427.

International Preliminary Report on Patentability Chapter 1for International Application No. PCT/SG2018/050427.

* cited by examiner

MOUNTING STRUCTURE

FIELD OF INVENTION

The present invention relates to a mounting structure for supporting one or more panels such as photovoltaic, glass and aluminium panels.

BACKGROUND ART

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Photovoltaic (PV) panels are typically mounted on racks which are retrofitted on rooftops. PV panels are conventionally mounted in a top-down manner in which a bottom surface of a PV panel (the side not facing the sunlight) rests on a rigid top surface of the racks. Thereafter, a clamping means is used to clamp the bottom surface of the PV panel against the rigid top surface of the racks for securing the PV panel on the racks.

As the PV panels are arranged in a closely packed array, a disadvantage of top down mounting is the difficulty faced during maintenance works when trying to access a PV panel that is mounted within the closely packed array. A common solution to the foregoing problem is to provide aisles or corridors for enabling maintenance access to PV panels located within the array. However, the provision of aisles or corridors reduces space efficiency and less solar power is generated per unit area.

The same problem is faced during assembly and/or maintenance checks of other types of panels such as glass panels and aluminium panels that are formed in a closed packed array, for example glass panels that form the vertical façade of a building where the glass panels have to be assembled and/or accessed from the exterior of the building.

SUMMARY OF THE INVENTION

This invention seeks to provide a mounting structure, a mounting structure assembly and a method of assembling a mounting structure assembly.

In an aspect of the invention, there is a mounting structure comprising a structural member having a first surface adapted to engage a support and at least one first flange extending outwardly from a second surface, wherein the first surface is distal from the first flange; and at least one securing member comprising at least one second flange extending outwardly from a surface of the securing member, wherein the securing member is operable to juxtapose with the structural member via the first surface, and engage with the structural member to secure a side of a panel between the first flange and the second flange.

The invention allows individual panel dismantling from the inside (in the case of a building façade) or the underside (in the case of PV panels) of an assembled mounting structure system and array, leading to safer, easier maintenance and troubleshooting.

Preferably the second surface adjoins the first surface.

Advantageously the structural member is a beam and the second surface is parallel to a longitudinal axis of the beam.

It is preferable if the first surface comprises one or more strut channels, and the first surface is adapted to engage the support via at least one channel securing element and the one or more strut channels. Preferably the number of strut channels is three because this arrangement provides rotational restraint of the structural member when engaged to the support.

It is advantageous if the structural member comprises one or more alignment guides, preferably located at an end of the structural member.

The mounting structure may further comprise a water-resistant cap adapted to juxtapose with the structural member via a surface opposing the first surface. The water-resistant cap is particularly useful in the case of a mounting structure assembly having an array of panels arranged on a roof because the cap prevents water from penetrating through the assembly.

Preferably the securing member comprises a length that is substantially shorter than a length of the structural member.

It is preferred if the securing member comprises a bracket having a cross-sectional shape that corresponds to a cross-sectional shape of the structural member. It is further preferred if the bracket comprises a U-shaped channel having a width wider than a width of the structural member.

In another aspect of the invention, there is a mounting structure assembly comprising a plurality of mounting structures as described above, the mounting structure assembly for supporting a plurality of panels.

Advantageously, the mounting structure assembly comprises at least one joint member for sealingly connecting a plurality of mounting structure to each other. Preferably the joint member has one or more alignment notches to align with the one or more alignment guides of the structural member.

The joint member is a cross-joint having four engaging ends, each end adapted to abut against an end of a structural member of a mounting structure. It is preferred if the joint member is adapted to be covered by a water-resistant cap which provides the same advantage as the water-resistant cap of the mounting structure.

The invention is of particular advantage for the mounting of an array of photovoltaic solar panels.

In another aspect of the invention, there is a method of assembling a mounting structure assembly, the method comprising the steps of:

(a) connecting a plurality of structural members and joint members together, wherein the structural member has a first surface adapted to engage a support and at least one first flange extending outwardly from a second surface, and wherein the first surface is distal from the first flange;

(b) engaging the first surface of at least one structural member to a support; and (c) engaging at least one securing member comprising at least one second flange extending outwardly from a surface of the securing member, with at least one structural member via the first surface, to secure a side of a panel between the first flange and the second flange.

Advantageously the first surface comprises at least one strut channel and the step of engaging the first surface to the support comprises forming one or more contact points by receiving and locking a channel securing element extending from the support, within one strut channel.

Preferably the one or more contact points define the corners of a quadrilateral.

In another aspect of the invention, there is a bottom-up method of assembling a mounting structure for mounting at least one photovoltaic solar panel having a top surface and a bottom surface, the method comprising the steps of:

(a) engaging a bottom first surface of a structural member to a support, the structural member comprising at least one first flange extending outwardly from a second surface, wherein the bottom first surface is distal from the first flange;

(b) juxtaposing at least one securing member comprising at least one second flange extending outwardly from a surface of the securing member, with the structural member via the bottom first surface;

(c) contacting the bottom surface of the photovoltaic solar panel with the second flange, and urging the panel towards the first flange and to abut its top surface with the first flange; and (d) engaging the securing member with the structural member to secure a side of the photovoltaic panel between the first flange and the second flange.

It is preferred if the bottom-up method further comprises connecting a plurality of structural members and joint members together to form a mounting structure assembly.

Conventional PV panel mounting structures are made up of separate structural elements and architectural components mounted on a main structure like the top of the building. The present invention is advantageous by combining these structural elements and architectural components together, thereby reducing the overall cost of the mounting structure assembly. It is also possible for PV panels array to act as a roof structure or façade.

Other aspects of the invention will become apparent to those of ordinary skill in the art upon review of the following description of specific embodiments of the invention in conjunction with the accompanying figures.

BRIEF DESCRIPTION OF THE DRAWINGS

The present invention will now be described, by way of example only, with reference to the accompanying drawings, which are for illustrative purposes only and are therefore not drawn to scale, in which.

DESCRIPTION OF EMBODIMENTS OF THE INVENTION

Particular embodiments of the present invention will now be described with reference to the accompanying drawings. The terminology used herein is for the purpose of describing particular embodiments only and is not intended to limit the scope of the present invention. Other definitions for selected terms used herein may be found within the detailed description of the invention and apply throughout the description. Additionally, unless defined otherwise, all technical and scientific terms used herein have the same meanings as commonly understood by one of ordinary skill in the art to which this invention belongs. Where possible, the same reference numerals are used throughout the figures for clarity and consistency.

Throughout the specification, unless the context requires otherwise, the word "comprise" or variations such as "comprises" or "comprising, will be understood to imply the inclusion of a stated integer or group of integers but not the exclusion of any other integer or group of integers.

Furthermore, throughout the specification, unless the context requires otherwise, the word "include" or variations such as "includes" or "including" will be understood to imply the inclusion of a stated integer or group of integers but not the exclusion of any other integer or group of integers.

Figure 2:
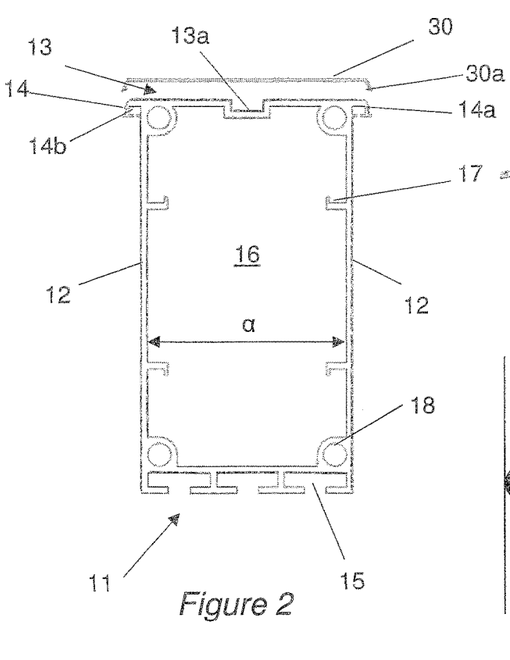
FIG. 2 illustrates the structural member of FIG. 1 viewed from one end of the structural member.

The terms "top" (or "above") and "bottom" (or "below") used throughout the specification will have ordinary meaning in the art and will be understood by a skilled person to refer to how far an article is placed with respect to a ground level, for example, an article is located at the bottom if it is closer to a ground level compared to an article located at the top. For the avoidance of doubt, FIG. 2 shows the surface 13 as a top surface and surface 11 as a bottom surface.

The invention relates to a mounting structure that is preferably for supporting panels.

An embodiment of the invention will now be described with specific reference to the mounting of PV panels, although as mentioned earlier the invention is not limited to the mounting of such panels.

Figure 7:
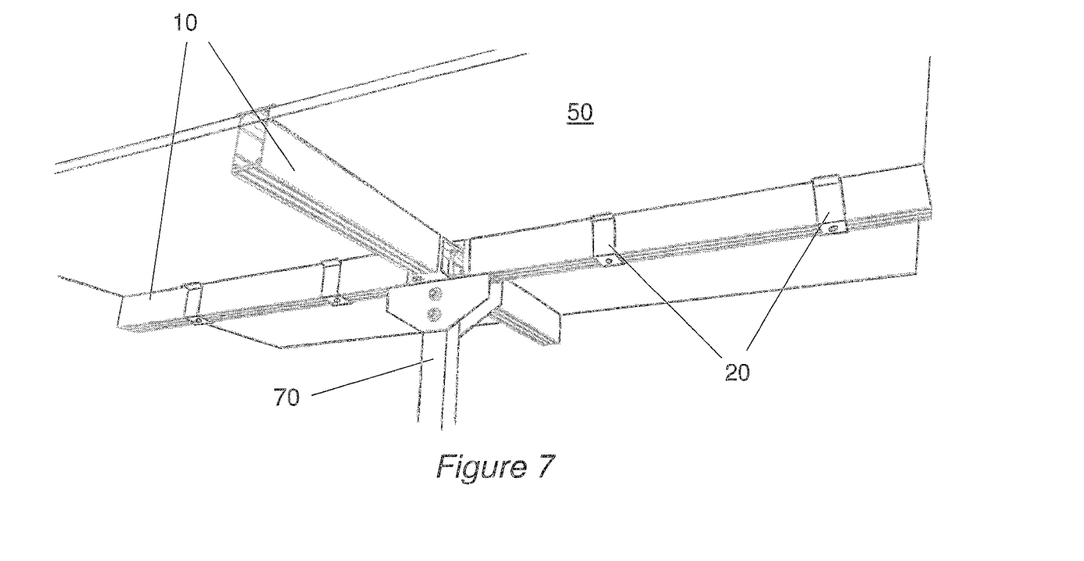
FIG. 7 is a bottom perspective view of a mounting structure assembly according to the invention.
Figure 8:
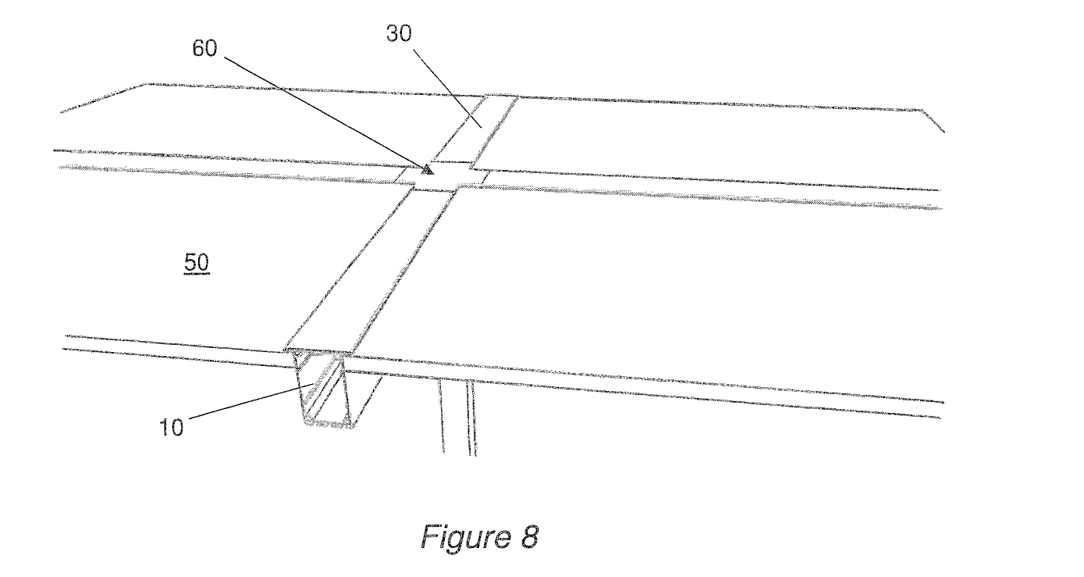
FIG. 8 is a top perspective view of the mounting structure assembly according to an embodiment of the present invention.

Referring to the figures, according to a first aspect of the invention there is a mounting structure for supporting a panel 50, preferably a PV panel, in a bottom up manner wherein the bottom refers to the part of the panel 50 facing away from the sunlight (FIG. 7 shows the bottom of panel 50) and the top refers to the part of the panel 50 facing the sunlight (FIG. 8 shows the top of the panel 50).

In a preferred embodiment of the invention, the mounting structure comprises a structural member 10 and a securing member 20. One or more mounting structures can be connected to one or more joint members 40 and panels 50 to form a mounting structure assembly (FIGS. 7 to 11). The mounting structure assembly of the present invention can function for example as a shelter or part of a rooftop if placed on top of a building, or the façade of building.

Structural Member

Figure 1:
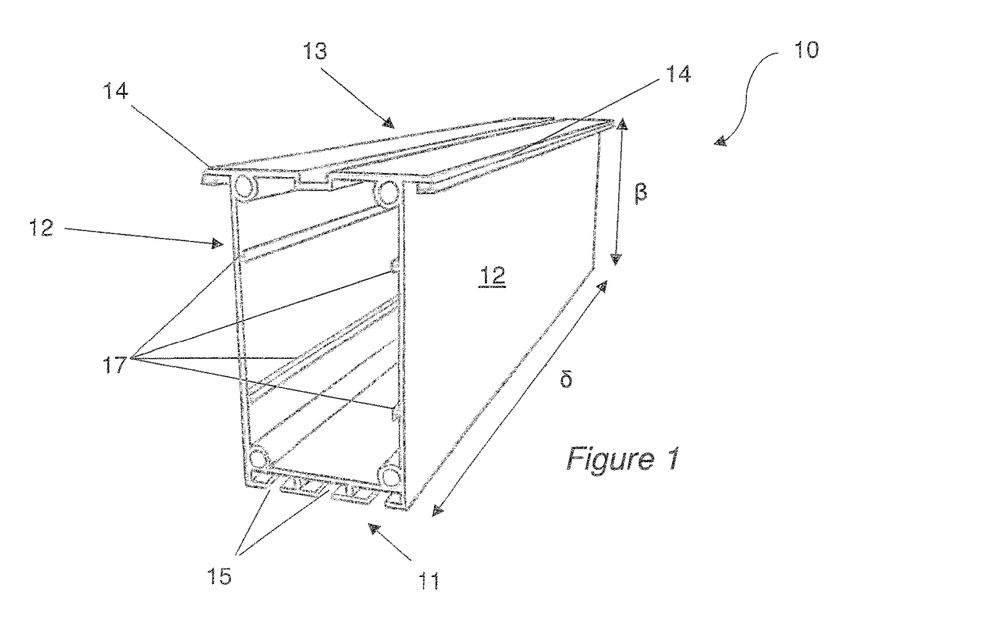
FIG. 1 is a perspective view of a structural member of a mounting structure according to an embodiment of the present invention.

As shown in FIGS. 1 and 2, the structural member 10 is depicted as a elongate beam having a quadrilateral body with a width α, depth β and a length δ. The structural member 10 has a first surface 11 adapted to engage a support, sides 12 (second surface) that abuts against a panel in operation, and third surface 13. Sides 12 adjoin first surface 11 and third surface 13, and the first surface 11 and third surface 13 are opposing surfaces. Surface 11 can be considered a bottom surface (or a surface of the base of the structural member 10) and surface 13 can be considered a top surface (or a surface of the top of the structural member 10) when used with panels that are arranged horizontally or at an incline when in operation. The support can be a vertical pillar 70 as illustrated in FIG. 7. The structural member 10 comprises flanges 14 (first flanges) that extend outwardly from sides 12 of the structural member 10. The flanges 14 are substantially parallel to the longitudinal axis of the structural member 10. In various embodiments, the flanges 14 may be located anywhere along the sides 12 (i.e. along depth β). In a preferred embodiment, the flanges 14 are at a distal location from first surface 11. More preferably, the flanges 14 are located at the third surface 13 (as shown in FIGS. 1 and 2) or proximate to the third surface 13. The term "distal" has ordinary meaning in the art and the location of the flanges 14 are taken with reference to the first surface 11. Importantly, there is a distance between the flanges 14 and first surface 11 to allow a panel 50 to be clamped between the flanges 14 of the structural member 10 and the flanges 24 of the securing member 20, when the securing member 20 is engaged with the structural member 10 via the first surface 11. Preferably, this distance is at least the thickness of the panel 50 being clamped.

The flanges 14 preferably extend orthogonally from the sides 12. In various embodiments, the flanges 14 may extend outwardly at an acute or obtuse angle with respect to the sides 12. The distance of extension of the flanges 14 will depend on the application and requirements of the present invention. Therefore, it will be appreciated that one flange 14 on one side 12 may extend outwardly at a different angle and/or different distance compared to the other flange 14 on the opposing side 12 of the structural member 10. It will also be appreciated that one flange 14 on one side 12 may be located at a different location distal from the first surface 11, compared to the other flange 14 of the opposing side 12 of the structural member 10. In various embodiments, the structural member 10 may comprise only one flange 14 extending out from only one side 12.

Figure 2A:
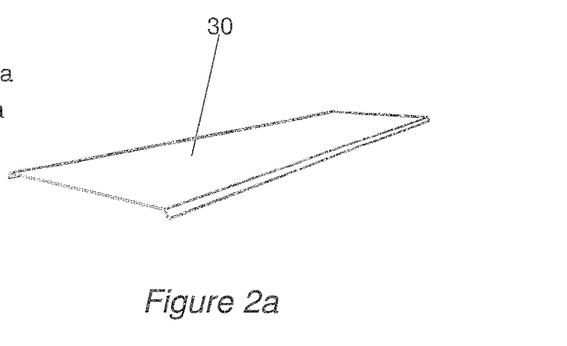
FIG. 2a is a perspective view of a cap for juxtaposing with a structural member according to an embodiment of the present invention.

Each flange 14 comprises a cap engagement notch 14a that allows the engagement of a catch 30a of a water-resistant cap 30 with the structural member 10. The cap 30 covers the structural member 10. As shown in FIG. 2a, the water-resistant cap 30 comprises angled edges that conforms to the shape of the second surface 12 of the structural member 10. The catch 30a is located at the end of the angled edges. The water-resistant cap 30 comprises a length that may be more than, equal to or less than the length δ of the structural member 10. Each flange 14 also comprises a flange channel 14b for receiving a sealer (includes but is not limited to gaskets) that urges against a surface of the panel 50 when the mounting structure is in use. This water-resistant cap 30 and/or sealer prevent water from penetrating the space between the mounting structure and the panel 50 so as to reduce wear and tear, and/or to maintain engagement between the mounting structure and the panel 50.

The structural member 10 comprises a cavity 16, which may be used to lay for example electrical cables. The structural member 10 has one or more alignment guides 17 which extend into the cavity 16 from an internal surface of the structural member 10. The alignment guides 17 may extend along the length δ of the structural member 10 and end at both ends of the structural member 10. In various embodiments, the alignment guides 17 are discontinuous and are preferably only located at the ends of the structural member 10, i.e. they do not extend along the length of the structural member 10. The alignment guides 17 enable the structural member 10 to be aligned with alignment notches 47 of a joint member 40 (FIG. 5) or another structural member 10. If more than one structural member 10 are to be joined together, one end of each structural member 10 may comprise alignment guides 17 while the other end may comprise alignment notches 47.

The structural member 10 further comprises connection bores 18 that allow for example a threaded screw and/or a nut and bolt 49 (FIG. 11) to connect more than one structural member 10 together, or to connect a structural member 10 to a joint member 40. In various embodiments the connection between structural members 10 and/or structural members 10 and joint members 40 is achieved by other means known in the art, for example welding, the structural members 10 may not comprise connection bores 18.

Figure 2B:
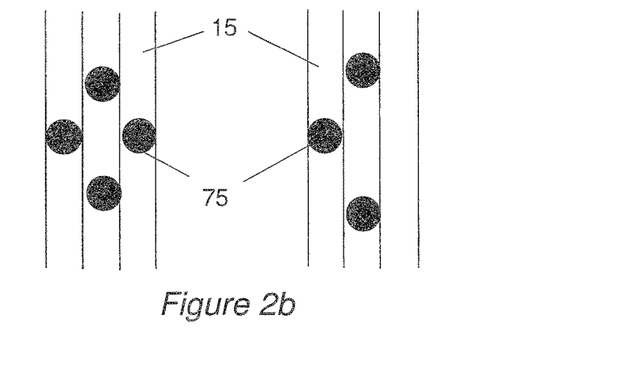
FIG. 2b illustrates the arrangement of channel securing elements within the channels.

The first surface 11 is adapted to engage a support 70. The first surface 11 comprise strut channels 15, which preferably run along the length δ of the structural member 10. In various embodiments, the strut channels 15 are integral and form a unitary structure with the structural member 10. In other various embodiments, the strut channels 15 are separate structures and are attachable to the first surface 11 by means known in the art (includes but not limited to screws, adhesives and welding). The longitudinal axis of each strut channel 15 is substantially aligned with the longitudinal axis of the structural member 10. The strut channels 15 facilitate attachment of the structural member 10 to the vertical pillar 70 so that the structural member 10 can be elevated above the ground by the vertical pillar 70. As shown in FIG. 2, the structural member 10 comprises three strut channels 15 but more or less channels are included in the scope of the invention. Preferably, the first surface 11 comprises at least two strut channels 15. The strut channels 15 are operable to receive channel securing elements 75 that connect the structural member 10 with the support 70. Channel securing elements 75 include but are not limited to screws, bolts, nuts or any other form of mechanical securing element that can be used to fasten the structural member 10 to the vertical pillar 70. Preferably, the channel securing elements 75 are anti-rotational channel securing elements that prevent lateral rotation of the channel securing elements 75 once they are installed within the strut channels 15. In preferred embodiments, channel securing elements 75 are bolts or nuts. Strut channels 15 are advantageous because the support 70 can be connected to the structural member 10 anywhere along the length of the structural member 10. Further, more than one strut channel 15 is advantageous because channel securing elements 75 can be arranged in various manner to connect the structural member 15 with the support 70, so as to provide lateral and/or longitudinal rotation restraint of the structural member 10 about the support 70. A higher level of restraint will provide a stiffer and thus stronger structural support. FIG. 2b illustrates how channel securing elements 75 may be arranged within strut channels 15, where the channel securing elements 75 form contact points with the strut channels 15. The left figure shows the channel securing elements 75 being arranged in a quadrilateral, where the channel securing elements 75 form the corners of the quadrilateral. The quadrilateral configuration enhances structural integrity by resisting angular rotation about both the longitudinal and lateral axes of the structural member 10.

The right figure shows the contact points in the shape of a triangle where the channel securing elements 75 form the corners of the triangle. The left figure is preferable over the right figure because it better provides longitudinal rotation restraint of the structural member 10 with respect to the support 70. Preferably, a channel securing element 75 extending from the support 70 is received and locked within one strut channel 15.

The structural member 10 may be formed from any suitable material which includes but is not limited to metals (e.g. aluminium and steel), plastics (e.g. polyvinyl chloride) and compositions thereof. The structural member 10 is preferably formed by metal extrusion.

Securing Member

Figure 3:
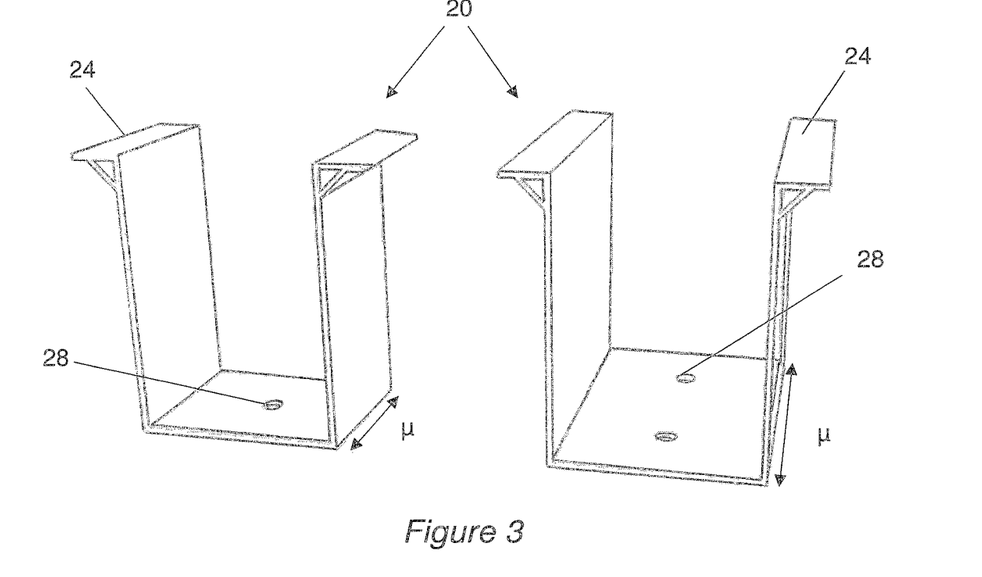
FIG. 3 shows perspective views of a securing member of a mounting structure according to preferred embodiments of the present invention.

FIG. 3 shows perspective views of two embodiments of the securing member 20. The securing member 20 in these instances are brackets having one or two holes 28 at their bases for attachment to the structural member 10 as will be further explained below. The securing member 20 comprises a length $\mu$, depth $\gamma$ and width $\epsilon$.

Figure 4:
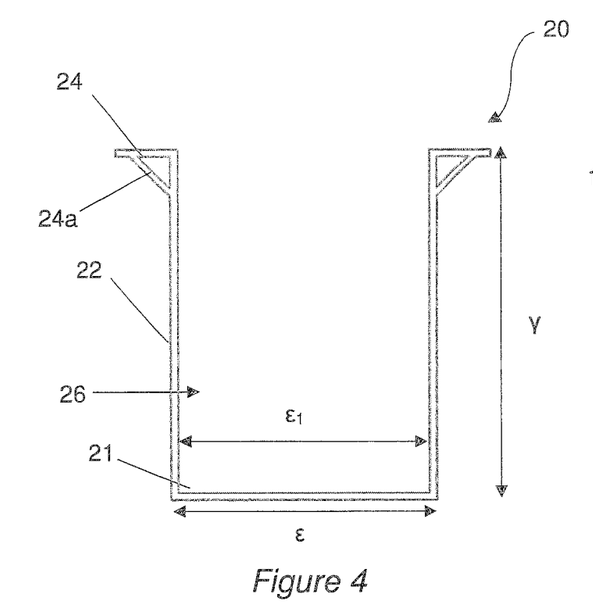
FIG. 4 illustrates the securing member of FIG. 3 viewed from one end of the securing member.

As illustrated in FIG. 4, the securing member 20 is a bracket having a base 21 and sides 22. The base 21 and sides 22 defining a U-shaped channel 26 which has an internal width $\epsilon_1$ that is less than the width c of the securing member 20, i.e. internal width $\epsilon_1$=width $\epsilon$–thickness of sides 22. The securing member 20 comprises flanges 24 (second flanges) that extend outwardly from sides 22 of the securing member 20. The flanges 24 comprise bracings 24a that support the flanges 24 and prevent them from buckling when the flanges 24 urge against a surface of a panel 50, to urge the panel 50 against the flanges 14 of the structural member 10 when in use. The flanges 24 are substantially parallel to the longitudinal axis of the securing member 20. In various embodiments, the flanges 24 may be located anywhere along the sides 22 (i.e. along depth $\gamma$). In a preferred embodiment, the flanges 24 are at a distal location from the base 21. More preferably, the flanges 24 are located at the free edge of sides 22 where the depth $\gamma$ defines the distance between the base 21 and the flanges 24 (as shown in FIGS. 3 and 4). It will be appreciated that this distance, as well as the depth $\gamma$, is dependent on the depth $\beta$ of the structural member 10 and the thickness of the panel 50 being installed, for example, depth $\gamma \geq$ depth $\beta$–thickness of panel 50. It is preferable that there is a gap between the base 21 and the first surface 11. A gap provides a distance for the base 21 to move towards the first surface 11, which can increase the clamping force exerted by the flanges 24 urging against a panel 50 and the flanges 14. This improves the securing of a panel 50 between the flanges 14, 24.

The flanges 24 preferably extend orthogonally from the sides 22. In various embodiments, the flanges 24 may extend outwardly at an acute or obtuse angle with respect to the sides 22. The distance of extension of the flanges 24 will depend on the application and requirements of the present invention. Therefore, it will be appreciated that one flange 24 on one side 22 may extend outwardly at a different angle and/or different distance compared to the other flange 24 on the opposing side 22 of the securing member 20. It will also be appreciated that one flange 24 on one side 22 may be located at a different location distal from the base 21, compared to the other flange 24 of the opposing side 22 of the securing member 20. In various embodiments, the securing member 20 may comprise only one flange 24 extending out from only one side 22.

Figure 4A:
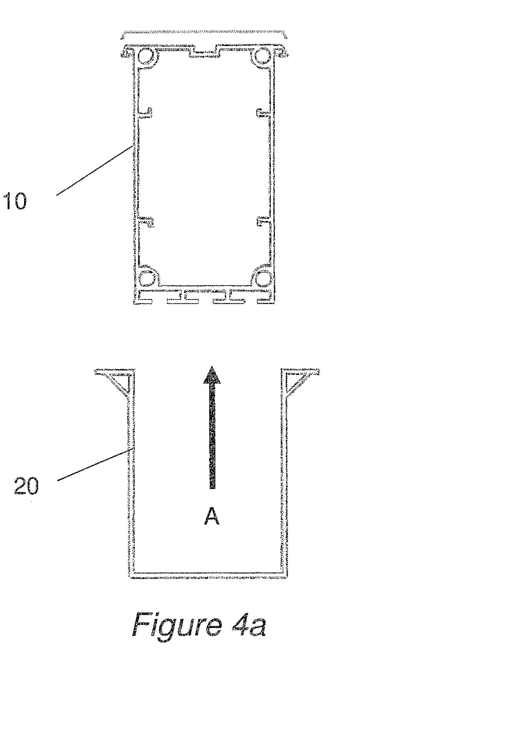
FIG. 4a illustrates the securing member being connected with the structural member according to an embodiment of the present invention.
Figure 10:
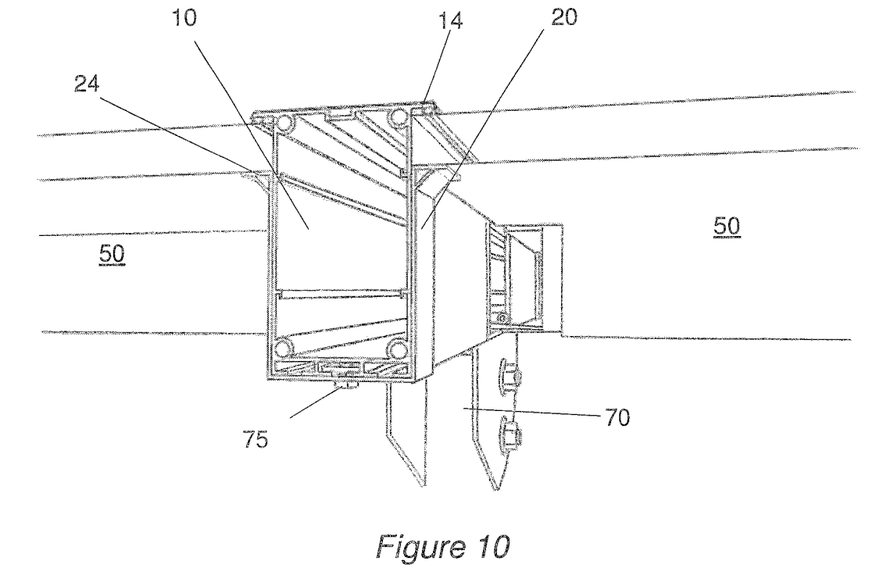
FIG. 10 is a sectional view of the mounting structure assembly of FIG. 9 viewed along the line X-X.

As shown in FIG. 4a, the securing member 20 is operable to juxtapose with the structural member 10 via the first surface 11, and engage with the structural member 10 to secure a side of the panel 50 between the flanges 14 and the flanges 24. The juxtaposition of the securing member 20 and the structural member 10 comprises bringing the base 21 in close proximity or contact with the first surface 11, by moving the securing member 20 in the direction A towards the structural member 10. In a preferred embodiment, the base 21 is in close proximity with the first surface 11. As shown in FIG. 10, the juxtaposition of the structural member 10 and the securing member 20 secures a side of a panel 50 between the flanges 14 and flanges 24. Preferably the internal width $\epsilon_1$ of the U-shaped channel 26 is wider than the width $\alpha$ of the structural member 10 such that the U-shaped channel 26 is capable of receiving the structural member 10. It is preferred that the juxtaposition of the structural member 10 and the securing member 20 is a fitting engagement.

Securing means which include but are not limited to screw, nuts and bolts, may be used to secure the structural member 10 with the securing member 20 via holes 28 at the base 21 of the securing member 20. Other securing means known to the person of skill in the art are included in the scope of the invention, for example the use of adhesives. One or more types of securing means may be used to secure the structural member 10 with the securing member 20. In a preferred embodiment, a through bolt is use to secure the structural member 10 with the securing member 20, where the head of the bolt or nut sits in a recess 13a of the third surface 13 of the structural member 10, and the body of the bolt extends through cavity 16 and out through the first surface 11 and base 21 (via holes 28), to the head of the bolt or nut.

In various embodiments, the length $\mu$ of the securing member 20 is substantially shorter than the length $\delta$ of the structural member 10. Consequently, multiple securing members 20 may be used along the longitudinal axis of the structural member 10 to secure one or more panels 50 between the flanges 14, 24. The structural member 10 can be formed to any desired length and each securing member 20 can be formed to various desired lengths depending on the structural member 10 and the applications and requirements of the invention. When in use, each securing member 20 engaged with a structural member 10 may have different or same lengths $\mu$.

The securing member 20 may be formed from any suitable material which includes but is not limited to metals (e.g. aluminium and steel), plastics (e.g. polyvinyl chloride) and compositions thereof. The securing member 20 may be formed from the same or different material as the structural member 10. The securing member 20 is preferably formed by metal extrusion.

Joint Member

Figure 5:
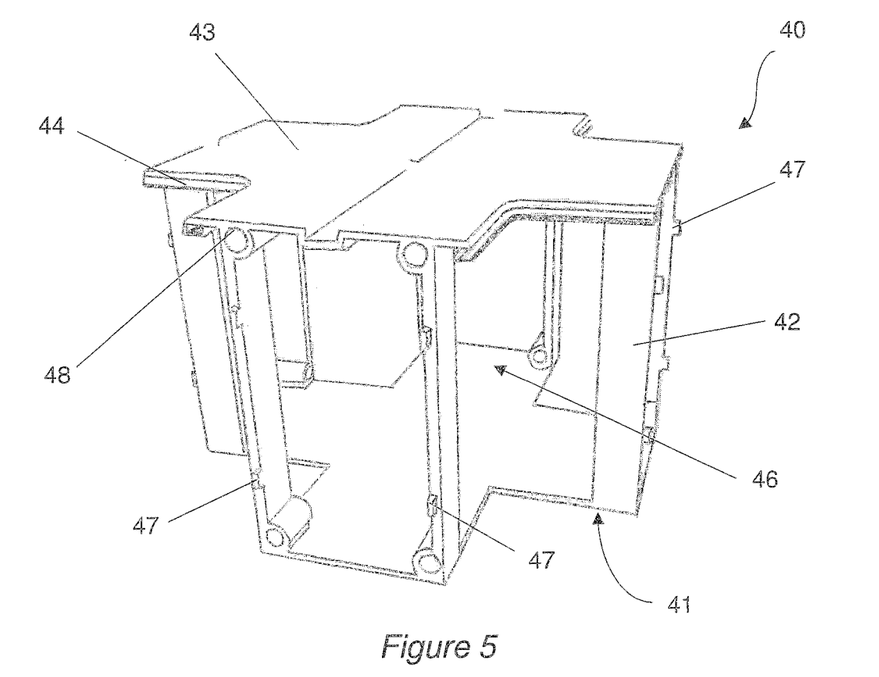
FIG. 5 is a perspective view of a joint member according to an embodiment of the present invention.
Figure 6:
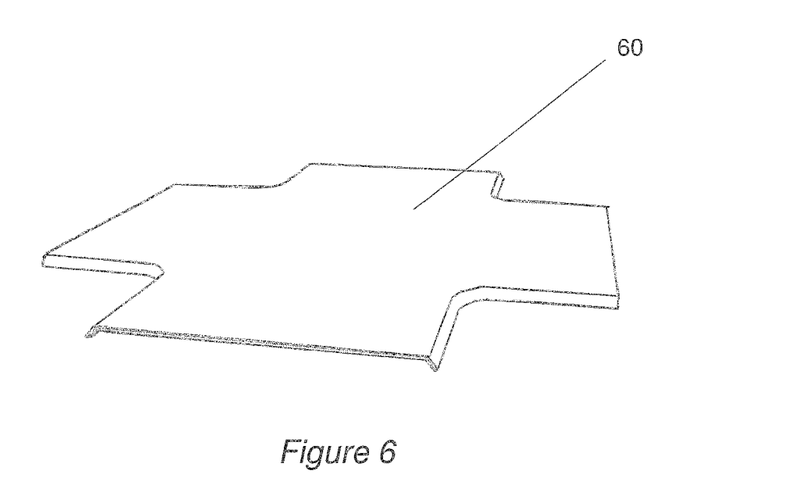
FIG. 6 is a perspective view of a cap for juxtaposing with a joint member according to an embodiment of the present invention.

FIG. 5 provides an embodiment of a joint member 40. The joint member 40 is adapted to sealingly engage and join/connect one or more structural members 10 together. In a preferred embodiment, the joint member 40 is a cross-joint having four engaging ends, each end adapted to abut against an end of a structural member 10 of a mounting structure. The joint member 40 is operable to sealingly engage both the structural members 10 and the panels 50 so as to provide a seal to prevent water on the top surfaces of the panels 50 to flow through the panel array. It will be appreciated that the joint member 40 may have shapes other than a cross-joint, and each end of the joint member 40 may be at a different angle with respect to another end.

Similar to the structural member 10, the joint member 40 comprises a first surface 41, sides 42 (second surfaces) and third surface 43. In a preferred embodiment, the first surface 41 is not adapted to engage a support, i.e. the joint member 40 is not a structural component in the mounting structure assembly and has a minimum load bearing capacity. Sides 42 adjoin first surface 41 and third surface 43. As shown in FIG. 5, sides 42 are discontinuous surface. In other various embodiments, the sides 42 are continuous surfaces. Surface 41 can be considered a bottom surface (or a surface of the base of the joint member 40) and surface 43 can be considered a top surface (or a surface of the top of the joint member 40) when used with panels that are arranged horizontally or at an inclined when in operation. The joint member 40 comprises a depth that is substantially similar to or is the same as depth β of the structural member 10.

The joint member 40 comprises one or more flanges 44 that extend outwardly from the sides 42, and the third surface 43, of the joint member 40. The location of flanges 44 correspond to the flanges 14 of the structural member 10 to ensure a sealing engagement between the structural member 10 and the joint member 40. When in use, the flanges 14, 44 are continuous in the mounting structure assembly. The flanges 44 preferably extend orthogonally from the sides 42. In various embodiments, the flanges 44 may extend outwardly at an acute or obtuse angle with respect to the sides 42. The distance of extension of the flanges 44 will depend on the application and requirements of the present invention. Therefore, it will be appreciated that one flange 44 on one side 42 may extend outwardly at a different angle and/or different distance compared to another flange 44 on another side 42 of the joint member 40.

Similar to flanges 14 of the structural member 10, each flange 44 comprises a cap engagement notch that allows the engagement of a catch of a water-resistant cap 60 with the joint member 40. The cap 60 covers the joint member 40. The water-resistant cap 60 conforms to the shape and size of the joint member 40, in particular to the third surface 43. Each flange 44 also comprises a flange channel for receiving a sealer that urges against a surface of the panel 50 when the mounting structure is in use. This water-resistant cap and/or sealer prevent water from penetrating the mounting structure assembly when in use. Example of a sealer is a rubber gasket.

The joint member 40 comprises a cavity 46 that is in fluid communication with the cavity 16 of the structural member 10 in the mounting structure assembly. Similarly, cavity 46 may be used to lay for example electrical cables. In a preferred embodiment, the sides 42 are discontinuous so that cavity 46 can be accessed. The joint member 40 has one or more alignment notches 47 which extend outwards from the ends of the joint member 40. The alignment notches 47 facilitate the connection of the structural members 10 with the joint member 40.

The joint member 40 further comprises connection bores 48 that allow for example a threaded screw and/or a nut and bolt 49 to connect the joint member 40 with one or more structural members 10. In various embodiments where the connection between joint members 40 and structural members 10 is achieved by other means known in the art, for example welding, the joint member 40 may not comprise connection bores 48.

The joint member 40 may be formed from any suitable material which includes but is not limited to metals (e.g. aluminium and steel), plastics (e.g. polyvinyl chloride) and compositions thereof. The joint member 40 may be formed by metal extrusion. The joint member 40 may be formed from the same or different material as the structural member 10 and/or the securing member 20.

Method of Assembling a Mounting Structure Assembly

According to another aspect of the invention, there is a method of assembling a mounting structure assembly for panels (i.e. assembling a plurality of panels and mounting structures) using the mounting structure and joint member as described above.

The mounting structure assembly method comprises the steps of connecting a plurality of structural members 10 and joint members 40 together, wherein the structural member 10 has a first surface 11 adapted to engage a support 70 and flanges 14 extending outwardly from a second surface 12, wherein the first surface 11 is distal from the flanges 14. The method also comprises engaging the first surface 11 of at least one structural member 10 to a support 70; and engaging at least one securing member 20 having flanges 24 extending outwardly from the surface 22 of the securing member 20, with at least one structural member 10 via the first surface 11, to secure a side of the panel 50 between the first flange 14 and the second flange 24. Preferably, the structural member 10 is arranged substantially perpendicular to the support 70.

The structural members 10 and the joint member 40 are connected together by first aligning the alignment notches 47 of the joint member 40 with the alignment guides of the structural members 10. Thereafter, suitable securing means such as threaded screws and/or nuts and bolts 49 are used to engage the connection bores 18, 48 together. Preferably, the connection bores 18, 48 are accessed via the cavity 46 of the joint member 40 because the joint member 40 preferably has discontinuous sides 42. In other embodiments, the structural members 10 and the joint member 40 are joined together via other suitable securing means which include but are not limited to adhesives.

In preferred embodiments of the invention, the first surface 11 comprises at least one strut channel 15 and the step of engaging the first surface 11 to the support 70 comprises forming one or more contact points by receiving and locking a channel securing element 75 extending from the support 70 within one strut channel 15. The channel securing element 75 forms a contact point with the strut channel 15. In preferred embodiments, the contact points define the corners of a quadrilateral, as shown in FIG. 2b.

In a preferred method, pressure exerted by the securing member 20 on the bottom surface of the panel 50 presses the panel 50 against the flanges 14 of the structural member 10. To release the panel 50, the securing member 20 is detached from the structural member 10.

In the case of a mounting system having an array of four panels 50, the method comprises the step of providing a cross-joint member 40 having four ends to sealingly connect the opposing corners of the panels 50, where each end abuts an end of a structural member 10. This forms a seal and the array of panels 50 can function for example as a rooftop or shelter if placed on top of a building.

Figure 9:
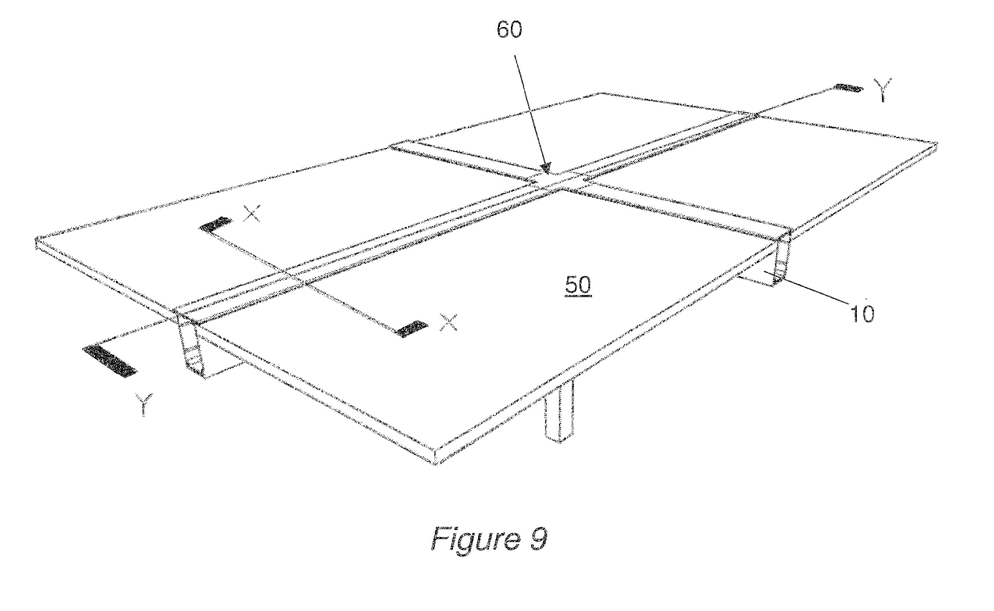
FIG. 9 is another perspective view of a mounting structure assembly according to an embodiment of the present invention.

FIGS. 7 to 11 provide a mounting structure assembly, where four structural members 10 and several securing members 20 support four panels 50, and the structural members 10 are joined by a joint member 40. In a preferred embodiment, the plurality of panels 50 form an array of photovoltaic solar panels. Naturally the mounting structure assembly can have more or less panels 11 and structural members 12. In the mounting structure assembly as illustrated in FIG. 9, the structural members 10 are arranged such that a first set of structural members 10 are laterally spaced apart and a second set of structural members 10 are arranged orthogonal to the first set of structural members 10.

Figure 11:
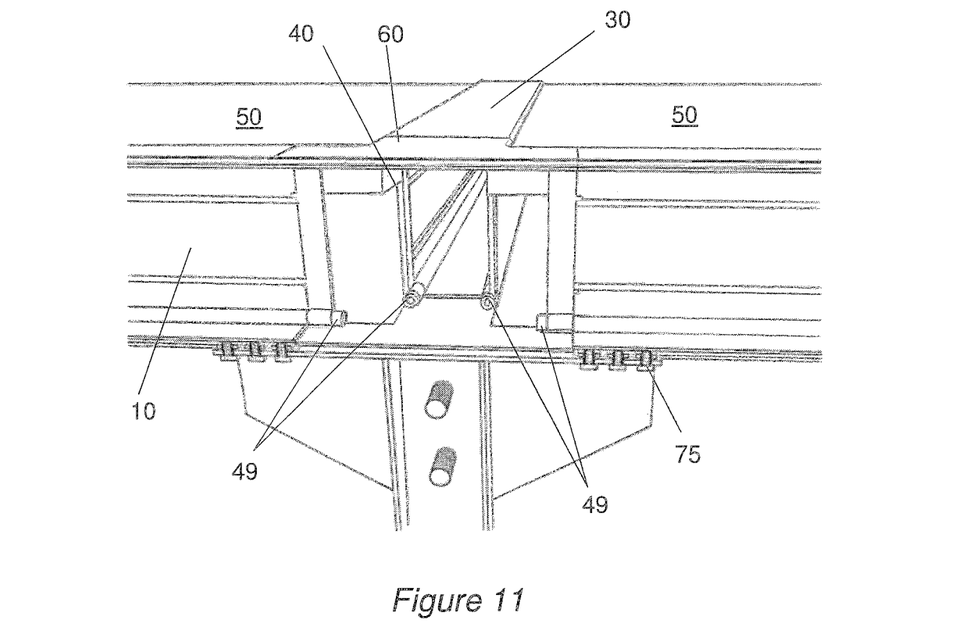
FIG. 11 is a sectional view of the mounting structure assembly of FIG. 9 viewed along the line Y-Y.

The mounting structure assembly is supported by a support 70. In a preferred embodiment, the support 70 engages with the first surfaces 11 of two laterally spaced structural members 10 which are joined by a joint member 40, as shown in FIG. 7. The support 70 engages the first surfaces 11 via channel securing elements 75 and strut channels 15, which are shown in FIGS. 10 and 11. The support 70 preferably traverses the joint member 40 because the joint member 40 is not intended for load bearing. In various embodiments, the end of the support 70 that engages the structural members 10 comprises a shape similar to that of the joint member 40, such that the support 70 is capable of engaging every structural member 10 that is connected with the joint member 40. In other embodiments, the support 70 engages only one structural member 10 and does not traverse the joint member 40.

The end of the support 70 that engages the structural member 10 may be inclined with respect to the direction of gravity, which allows the mounting structure assembly to be positioned at an incline which would be advantageous for PV panels to capture maximal sunlight.

After the mounting structure assembly has been assembled, water-resistant caps 30, 60 are juxtaposed with and attached to the third surface 13 of the structural member 10 and the third surface 43 of the joint member 40, so as to prevent water from penetrating the mounting structure assembly when in use. One or more caps 30 may be used to attach to the structural member 10 depending on the length of the structural member 10 and the caps 30. The caps 30, 60 may be modified, for example one end of one cap is tucked under one end of another cap, such that they overlap with one another, without leaving any gaps, so that water does not penetrate the mounting structure assembly when in use.

Bottom-Up Mounting Structure Assembly Method for a PV Panel

An aspect of the invention relates particularly to the mounting of PV panels from the bottom, the PV panel having a bottom surface and a top surface. As mentioned above, the bottom surface refers to the side of the PV panel that is not in contact with sunlight while the top surface refers to the side that does. In other words, the invention provides an assembly method which enables a reverse manner of mounting PV panels using a bottom-up approach as compared to conventional methods that utilize a top-down approach.

The bottom-up method comprises engaging the bottom first surface 11 of the structural member 10 to a support 70, the structural member 10 comprising at least one first flange 14 extending outwardly from a second surface 12, wherein the bottom first surface 11 is distal from the first flange 14, juxtaposing at least one securing member 20 comprising at least one second flange 24 extending outwardly from a surface of the securing member 20, with the structural member 10 via the bottom first surface 11, contacting the bottom surface of the PV panel 70 with the second flange 24, and urging the PV panel 70 towards the first flange 14 and to abut its top surface with the first flange 14, and engaging the securing member 20 with the structural member 10 to secure a side of the PV panel 70 between the first flange 14 and the second flange 24. It will appreciated that the first surface 11 is a bottom surface while the third surface 13 is a top surface.

It is appreciated by the person skilled in the art that variations and combinations of features described above, not being alternatives or substitutes, may be combined to form yet further embodiments falling within the intended scope of the invention. In particular, each structural member may be structurally reinforced through bracings in which a first end of the bracing is attached to the strut channel and a second end of the bracing is attached to a rigid body or the ground.

the longitudinal axis of the structural member may be inclined at an angle with respect to the ground for mounting panels at the angle.

the panel has a rectangular dimension. However, it may be appreciated that the panel may also have other dimensions not restricting the edges to be linear. For example, the panel may be circular. In such a case, the structural member may be shaped circularly lengthwise to conform to the circular edge of the panel. In various embodiments, a linear structural member may also be used to clamp a portion of the circular edge.

The invention claimed is:

1. A mounting structure comprising:
a structural member having a first surface adapted to engage a support and at least one first flange extending outwardly from a second surface, wherein the first surface is distal from the at least one first flange; and
at least one securing member comprising at least one second flange extending outwardly from a surface of the at least one securing member,
wherein the at least one securing member is operable to juxtapose with the structural member via the first surface, and engage with the structural member to secure a side of a panel between the at least one first flange and the at least one second flange, wherein the first surface comprises one or more strut channels that open away from the at least one first flange, and wherein the first surface is adapted to engage the support via at least channel securing element and the one or more strut channels,
wherein the at least one securing member comprises a bracket having a base and sides defining a U-shaped channel having a width wider than a width of the structural member such that the U-shaped channel is capable of receiving the structural member, and
wherein the at least one securing member is connected to the structural member via a bolt that is introduced from outside the base of the at least one securing member and into one of the one or more strut channels of the structural member.

2. The mounting structure according to claim 1, wherein the second surface adjoins the first surface.

3. The mounting structure according to claim 1, wherein the structural member is a beam and the second surface is parallel to a longitudinal axis of the beam.

4. The mounting structure according to claim 1, wherein the number of strut channels is three, wherein the longitudinal axis of each strut channel is substantially aligned with the longitudinal axis of the structural member.

5. The mounting structure according to claim 1, wherein the structural member comprises one or more alignment guides located at an end of the structural member.

6. The mounting structure according to claim 1, wherein the mounting structure further comprises a water-resistant cap adapted to juxtapose with the structural member via a surface opposing the first surface.

7. The mounting structure according to claim 1, wherein the at least one securing member comprises a length that is substantially shorter than a length of the structural member.

8. The mounting structure according to claim 1, wherein the bracket of the at least one securing member comprises a cross-sectional shape that corresponds to a cross-sectional shape of the structural member.

9. A mounting structure assembly comprising a plurality of mounting structures wherein each mounting structure comprises:
  a structural member having a first surface adapted to engage a support and at least one first flange extending outwardly from a second surface, wherein the first surface is distal from the at least one first flange; and
  at least one securing member comprising a bracket having a base and sides defining a U-shaped channel and at least one second flange extending outwardly from a surface of the at least one securing member, wherein the at least one securing member is operable to juxtapose with the structural member via the first surface, and engage with the structural member by receiving the structural member within the U-shaped channel to secure a side of a panel between the at least one first flange and the at least one second flange, wherein the first surface comprises one or more strut channels that open away from the at least one first flange, and wherein the first surface is adapted to engage the support via at least one channel securing element and the one or more strut channels, and
  wherein the at least one securing member is connected to the structural member via a bolt that is introduced from outside the base of the securing member and into a respective strut channel of the structural member;
  wherein the mounting assembly is for supporting a plurality of panels.

10. The mounting structure assembly according to claim 9, further comprising at least one joint member for sealingly connecting a plurality of structural members to each other wherein each mounting structure further comprises a water-resistant cap adapted to juxtapose with the structural member via a surface opposing the first surface wherein the joint member has one or more alignment notches to align with the one or more alignment guides of the structural member.

11. The mounting structure assembly according to claim 9, further comprising at least one joint member for sealingly connecting a plurality of structural members to each other wherein the joint member is a cross-joint having four engaging ends, each end adapted to abut against an end of a structural member of a mounting structure.

12. The mounting structure assembly according to claim 9, further comprising at least one joint member for sealingly connecting a plurality of structural members to each other, wherein the joint member is adapted to be covered by a water-resistant cap.

13. The mounting structure assembly according to claim 9, further comprising at least one joint member for sealingly connecting a plurality of structural members to each other.

14. A method of assembling a mounting structure assembly, the method comprising the steps of:
  a) connecting a plurality of structural members and joint members together, wherein each of the structural members has a first surface adapted to engage a support and at least one first flange extending outwardly from a second surface, and wherein the first surface is distal from the at least one first flange;
  b) engaging the first surface of at least one structural member to the support;
  c) engaging at least one securing member comprising a bracket having a base and sides defining a U-shaped channel and at least one second flange extending outwardly from a surface of the at least one securing member, with at least one structural member via the first surface, to secure a side of a panel between the at least one first flange and the at least one second flange, wherein the U-shaped channel receives a respective structural member, and
  d) after step (c), connecting the at least one securing member to the respective structural member by introducing a bolt from outside the base of the at least one securing member into the respective structural member,
  wherein the first surface comprises at least one strut channel that opens away from the at least one first flange, wherein the bolt is received within the at least one strut channel, and wherein the step of engaging the first surface to the support comprises forming one or more contact points by receiving and locking a channel securing element extending from the support, within the at least one strut channel.

15. The method according to claim 14, wherein the one or more contact points define the corners of a quadrilateral.

16. A bottom-up method of assembling a mounting structure for mounting at least one panel having a top surface and a bottom surface, the method comprising the steps of:
  engaging a bottom first surface of a structural member to a support, the structural member comprising at least one first flange extending outwardly from a second surface, wherein the bottom first surface is distal from the at least one first flange;
  juxtaposing at least one securing member comprising a bracket having a base and sides defining a U-shaped channel and at least one second flange extending outwardly from a surface of the securing member, with the structural member via the bottom first surface such that the U-shaped channel receives the structural member;
  contacting the bottom surface of the panel with the at least one second flange, and urging the panel towards the at least one first flange and to abut the panel's top surface with the at least one first flange;
  engaging the at least one securing member with the structural member to secure a side of the panel between the at least one first flange and the at least one second flange; and
  after step (d), connecting the at least one securing member to the structural member by introducing a bolt from outside the base of the at least one securing member into the structural member,
  wherein the bottom first surface comprises at least one strut channel that opens away from the at least one first flange, wherein the bolt is received within the at least one strut channel, and wherein the step of engaging the bottom first surface to the support comprises forming one or more contact points by receiving and locking a channel securing element extending from the support, within one strut channel.

17. The bottom-up method of claim 16, the method comprising connecting a plurality of structural members and joint members together to form a mounting structure assembly.

* * * * *